(12) United States Patent
Kim et al.

(10) Patent No.: US 10,152,766 B2
(45) Date of Patent: Dec. 11, 2018

(54) IMAGE PROCESSOR, METHOD, AND CHIPSET FOR INCREASING INTERGRATION AND PERFORMANCE OF IMAGE PROCESSING

(71) Applicant: Samsung Electronics Co., Ltd., Gyeonggi-do (KR)

(72) Inventors: Seong Woon Kim, Gyeonggi-do (KR); Sung Chul Yoon, Gyeonggi-do (KR); Sang Hoon Lee, Gyeonggi-do (KR); Ha Na Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 14/959,724

(22) Filed: Dec. 4, 2015

(65) Prior Publication Data
US 2016/0163020 A1 Jun. 9, 2016

(30) Foreign Application Priority Data
Dec. 4, 2014 (KR) ........................ 10-2014-0173133

(51) Int. Cl.
*G06T 1/60* (2006.01)
*G06T 1/20* (2006.01)
(Continued)

(52) U.S. Cl.
CPC .............. *G06T 1/60* (2013.01); *G06F 3/0611* (2013.01); *G06F 3/0683* (2013.01); *G06T 1/20* (2013.01);
(Continued)

(58) Field of Classification Search
None
See application file for complete search history.

(56) References Cited

U.S. PATENT DOCUMENTS 5,440,685 A * 8/1995 Takiyama ................. G06T 1/20
345/536
6,002,810 A * 12/1999 Wakisawa ............. G06T 3/4007
345/660
(Continued)

FOREIGN PATENT DOCUMENTS

JP 2000-125188 4/2000
JP 3984525 7/2007
(Continued)

*Primary Examiner* — Joni Richer
(74) *Attorney, Agent, or Firm* — The Farrell Law Firm, P.C.

(57) ABSTRACT

An image processor, an application processor, a method of operating an image processor, and a chips set of an image processor are provided. The image processor includes a scaler configured to perform scaling on an input image and generate a scaled input image; and a selection circuit configured to transmit the scaled input image to either a low latency memory or a high density memory according to a memory selection signal. The application processor includes a memory configured to store an input image; and an image processor configured to scale the input image, wherein the image processor comprises a scaler configured to perform scaling on the input image and generate a scaled input image and a selection circuit configured to transmit the scaled input image to either a low latency memory or a high density memory according to a memory selection signal.

11 Claims, 9 Drawing Sheets

(51) Int. Cl.
*G06T 3/40* (2006.01)
*G06F 3/06* (2006.01)
*G09G 5/393* (2006.01)
*G09G 5/399* (2006.01)

(52) U.S. Cl.
CPC .............. *G06T 3/40* (2013.01); *G09G 5/393* (2013.01); *G09G 5/399* (2013.01); *G09G 2340/00* (2013.01)

(56) References Cited

U.S. PATENT DOCUMENTS

| | | | |
|---|---|---|---|
| 6,667,773 B1 | 12/2003 | Han | |
| 6,710,810 B1* | 3/2004 | Hoshikawa | G09G 5/393 348/441 |
| 7,583,280 B2 | 9/2009 | Kubo et al. | |
| 7,800,700 B2 | 9/2010 | Lee et al. | |
| 7,920,150 B2 | 4/2011 | Ku et al. | |
| 2003/0081680 A1* | 5/2003 | Rathnam | H04N 19/51 375/240.16 |
| 2003/0174244 A1 | 9/2003 | Nakata | |
| 2005/0162337 A1* | 7/2005 | Ohashi | G06F 3/14 345/1.1 |
| 2006/0262223 A1* | 11/2006 | Lee | G06T 3/4007 348/581 |
| 2008/0267408 A1* | 10/2008 | Hsieh | H04L 9/3271 380/278 |
| 2014/0035955 A1 | 2/2014 | Wang | |
| 2014/0201477 A1* | 7/2014 | Greenfield | G06F 9/5016 711/158 |
| 2015/0181208 A1* | 6/2015 | Park | H04N 19/00206 375/240.02 |

FOREIGN PATENT DOCUMENTS

| | | |
|---|---|---|
| JP | 2007-286167 | 11/2007 |
| JP | 2009-42338 | 2/2009 |
| JP | 4392531 | 10/2009 |
| JP | 2010-91773 | 4/2010 |
| KR | 10-0695914 | 3/2007 |
| KR | 10-2011-0079314 | 7/2011 |

* cited by examiner

IMAGE PROCESSOR, METHOD, AND CHIPSET FOR INCREASING INTERGRATION AND PERFORMANCE OF IMAGE PROCESSING

PRIORITY

This application claims priority under 35 U.S.C. § 119(a) to a Korean Patent Application filed on Dec. 4, 2014 in the Korean Intellectual Property Office and assigned Serial No. 10-2014-0173133, the entire disclosure of which is incorporated herein by reference.

BACKGROUND

1. Field of the Disclosure

The present disclosure relates generally to an image processor, and more particularly, to an image processor for increasing the degree of integration and performance, a method of operating the same, and an application processor including the same.

2. Description of the Related Art

Recently, portable image players, such as smart phones and tablet computers, have become popular world-wide. Displays included in portable image players may have different resolutions and image data can be played at different resolutions even in one image player according to a user's request.

Image data can be converted into various resolutions and such a function is called scaling. An image processor performing scaling includes memory that temporarily stores input image data. An image processor requires high-speed memory to speed up the scaling of image data. However, high-speed memory occupies a wide area of an integrated circuit or chip and thus hinders the miniaturization of chips.

SUMMARY

An aspect of the present disclosure provides an image processor for increasing a degree of integration and performance.

Another aspect of the present disclosure provides an image processor that may include a controller configured to generate a memory selection signal based on a horizontal length of an input image, a number of pixels to be processed per cycle of a clock signal, and a read latency of a high density memory.

Another aspect of the present disclosure provides a memory selection signal that may have a level determined depending on a result of comparing a horizontal processing cycle obtained by dividing a horizontal length of the input image by a number of pixels processed per cycle of a clock signal with a read latency of a high density memory.

Another aspect of the present disclosure provides a scaled input image that may be transmitted to a high density memory when a horizontal processing cycle is greater than a read latency of the high density memory and may be transmitted to a low latency memory when the horizontal processing cycle is less than or equal to the read latency of the high density memory.

Another aspect of the present disclosure provides a scaler that may perform vertical scaling on a first line of an input image at a cycle immediately following completion of horizontal scaling on the first line of the input image.

Another aspect of the present disclosure provides a capacity of a high density memory that may be determined depending on a maximum horizontal length of a scaled input image or a vertical scaling method.

Another aspect of the present disclosure provides a capacity of a low latency memory that may be determined depending on a number of pixels processed during a read latency of a high density memory or a vertical scaling method.

Another aspect of the present disclosure provides a low latency memory that may be formed using at least one flip-flop.

Another aspect of the present disclosure provides an application processor that may include a controller configured to generate a memory selection signal based on a horizontal length of an input image, a number of pixels processed per cycle of a clock signal, and a read latency of a high density memory.

In accordance with an aspect of the present disclosure, an image processor is provided. The image processor includes a scaler configured to perform scaling on an input image and generate a scaled input image; and a selection circuit configured to transmit the scaled input image to either a low latency memory or a high density memory according to a memory selection signal.

In accordance with another embodiment of the present disclosure, there is provided an application processor. The application processor includes a memory configured to store an input image; and an image processor configured to scale the input image, wherein the image processor includes a scaler configured to perform scaling on the input image and generate a scaled input image and a selection circuit configured to transmit the scaled input image to either a low latency memory or a high density memory according to a memory selection signal.

In accordance with another aspect of the present disclosure, a method of operating an image processor is provided. The method includes performing horizontal scaling on a first line of an input image, transmitting the first line that has been vertically scaled to a low latency memory or a high density memory according to a memory selection signal, and performing vertical scaling on the first line at a cycle following completion of the horizontal scaling on the first line.

In accordance with another aspect of the present disclosure, a chipset of an image processor is provided. The chipset is configured to perform horizontal scaling on a first line of an input image; transmit the first line that has been vertically scaled to a low latency memory or a high density memory according to a memory selection signal; and perform vertical scaling on the first line at a cycle following completion of the horizontal scaling on the first line.

BRIEF DESCRIPTION OF THE DRAWINGS

The above and other aspects, features and advantages of the present disclosure will be more apparent from the following detailed description, taken in conjunction with the accompanying drawings, in which.

DETAILED DESCRIPTION OF EMBODIMENTS OF THE PRESENT DISCLOSURE

The present disclosure is described more fully hereinafter with reference to the accompanying drawings, in which embodiments of the present disclosure are shown. The present disclosure may, however, be embodied in many different forms and should not be construed as being limited to the embodiments of the present disclosure set forth herein. Rather, these embodiments are provided so that the present disclosure will be thorough and complete, and will fully convey the scope and spirit of the present disclosure to those skilled in the art. In the accompanying drawings, the size and relative sizes of layers and regions may be exaggerated for clarity. Like numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms "first," "second," etc. may be used herein to describe various elements, these elements should not be limited by these terms. These terms are only used to distinguish one element from another. For example, a first signal could be referred to as a second signal, and, similarly, a second signal could be referred to as a first signal without departing from the teachings of the present disclosure.

The terminology used herein is for the purpose of describing certain embodiments of the present disclosure only and is not intended to limit the present disclosure. As used herein, the singular forms "a," "an" and "the" are intended to include the plural forms as well, unless the context clearly indicates otherwise. It will be further understood that the terms "comprises," "comprising," "includes" and "including" when used in the present disclosure, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as commonly understood by one of ordinary skill in the art to which the present disclosure belongs. It will be further understood that terms, such as those defined in commonly used dictionaries, should be interpreted as having meanings that are consistent with their meanings in the context of the relevant art and/or the present disclosure, and should not be interpreted in an idealized or overly formal sense unless expressly so defined herein.

Figure 1:
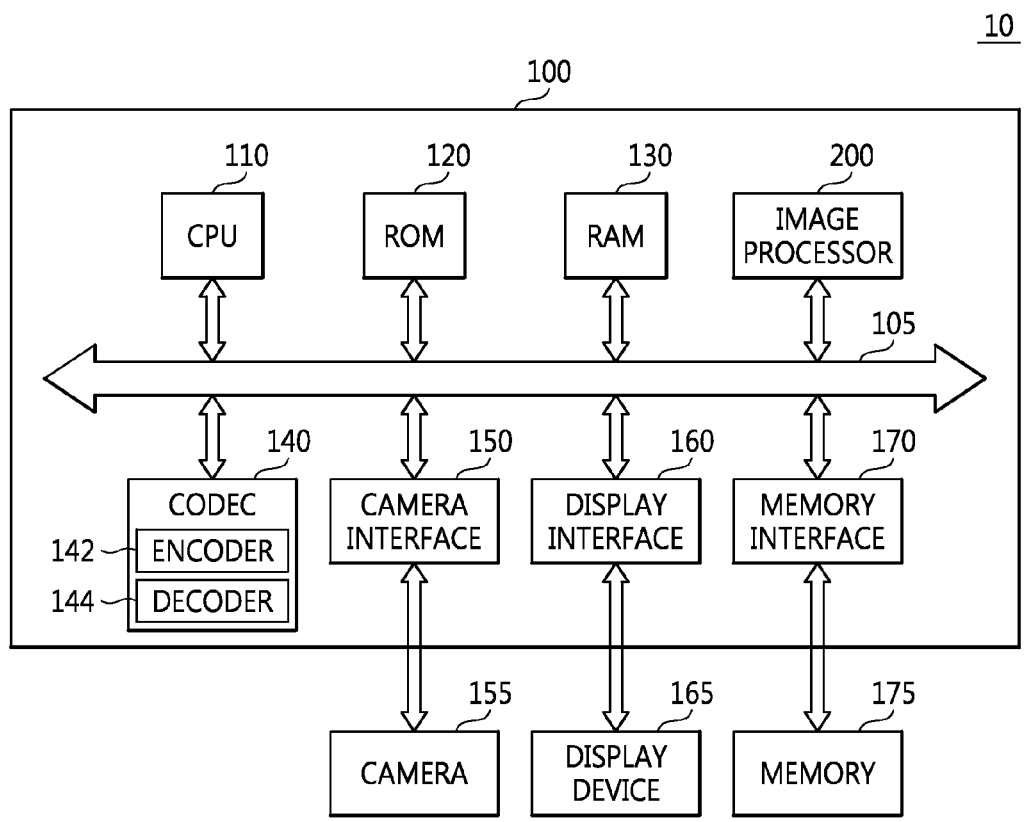
FIG. 1 is a block diagram of a data processing system according to an embodiment of the present disclosure.

FIG. 1 is a block diagram of a data processing system 10 according to an embodiment of the present disclosure.

Referring to FIG. 1, the data processing system 10 may be implemented as a mobile terminal such as a smart phone, a tablet personal computer (PC), a personal digital assistant (PDA), an enterprise digital assistant (EDA), a mobile internet device (MID), or an electronic book (e-book). The data processing system 10 may include an application processor 100, a camera 155, a display device 165, and a memory 175.

The application processor 100 may include a central processing unit 110, a read only memory (ROM) 120, a random access memory (RAM) 130, a coder/decoder (codec) 140, a camera interface 150, a display interface 160, a memory interface 170, and an image processor 200. The application processor 100 may be implemented as a system on chip (SoC). The CPU 110, the ROM 120, the RAM 130, the codec 140, the camera interface 150, the display interface 160, the memory interface 170, and the image processor 200 may communicate data with one another via a bus 105.

The CPU 110 may control the overall operation of the application processor 100. The CPU 110 may process or execute programs and/or data stored in the ROM 120 and/or the RAM 130. The CPU 110 may be implemented as a multi-core processor. The multi-core processor is a single computing component with two or more independent processors (or cores).

The ROM 120 may store programs and/or data which are used continuously. The ROM 120 may be formed of an erasable programmable ROM (EPROM) or an electrically erasable programmable ROM (EEPROM).

The RAM 130 may temporarily store programs, data, and/or instructions. The RAM 130 may be formed of a dynamic RAM (DRAM) or a static RAM (SRAM). The RAM 130 may temporarily store an input image or an output image, which is input or output through the camera interface 150, the display interface 160, or the memory 170 or generated by the codec 140 or the CPU 110.

The codec 140 may encode or decode data received from the camera 155 or data output to the display device 165. The codec 140 may include an encoder 142 and a decoder 144. Although the codec 140 is provided external to the camera interface 150 and/or the display interface 160 in the embodiment of the present disclosure illustrated in FIG. 1, the codec 140 may be included in the camera interface 150 and/or the display interface 160. It should not be construed that present disclosure is limited by the disposition of the codec 140.

The camera interface 150 may interface data (e.g., image data) input from the camera 155 external to the application processor 100. The camera 155 may generate data corresponding to an image captured using a plurality of photo-sensitive devices.

The display interface 160 may interface data (e.g., image data) output to the display device 165 external to the application processor 100. The display device 165 may output data corresponding to an image through a display such as a liquid crystal display (LCD) or an active matrix organic light emitting diode (AMOLED) display.

The memory interface 170 may interface data input from the memory 175 external to the application processor 100 or data output to the memory 175. The memory 175 may be a non-volatile memory such as flash memory or a resistive memory.

The image processor 200 may perform image processing on data received from the RAM 130, the camera interface 150, or the memory interface 170 and may output the processed data to the RAM 130, the display interface 160, or the memory interface 170. The image processor 200 may be implemented in software, hardware, or a combination thereof. The image processor 200 is described below in detail with reference to FIG. 2.

Figure 2:
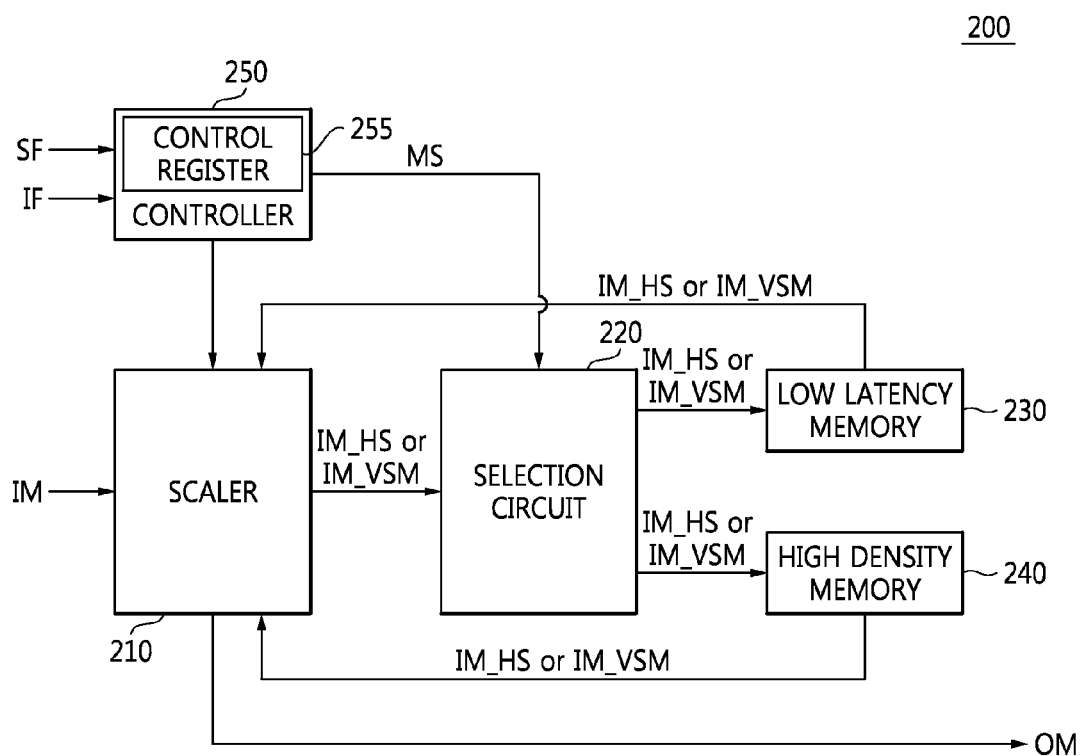
FIG. 2 is a block diagram of the image processor of FIG. 1 according to an embodiment of the present disclosure.

FIG. 2 is a block diagram of the image processor 200 of FIG. 1 according to an embodiment of the present disclosure.

Figure 3:
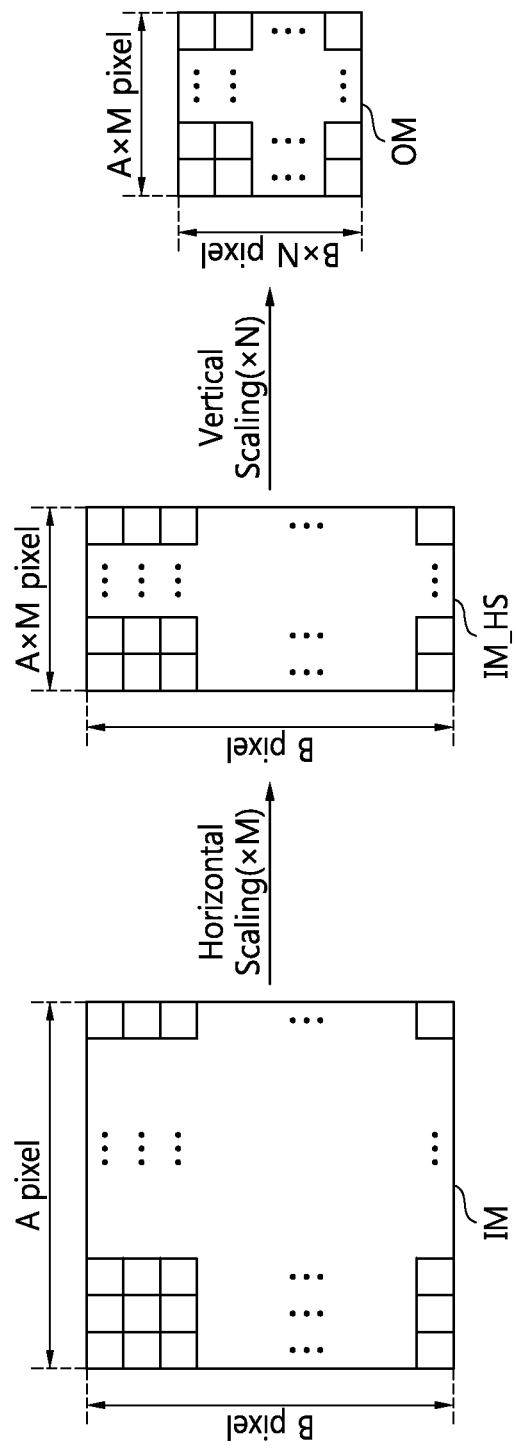
FIG. 3 is a diagram of an operation of a scaler of FIG. 2 according to an embodiment of the present disclosure.

FIG. 3 is a diagram of an operation of a scaler 210 of FIG. 2 according to an embodiment of the present disclosure.

Referring to FIGS. 1 through 3, the image processor 200 may include the scaler 210, a selection circuit 220, a low latency memory 230, a high density memory 240, and a controller 250.

The image processor 200 may also include a moving picture experts group (MPEG) circuit, an audio circuit, a graphics controller, and a deinterlacer besides the components illustrated in FIG. 2, but only circuit components involved with video scaling are illustrated and described here. The image processor 200 may be implemented as part of the application processor 100 as shown in FIG. 2, but it may be separately implemented in an integrated circuit (IC) or chip in an embodiment of the present disclosure.

The scaler 210 may scale an input image IM to generate a scaled input image IM_HS, scale an input image IM to generate a vertical scaling medium image IM_VSM, and output an output image OM. In this case, the input image IM may be image data having a certain resolution (e.g., 1280×720, 2560×1440, or 4096×2160) and may be a pixel stream.

Scaling may be an operation of enlarging or reducing the input image IM having a first resolution into the output image OM having a second resolution. In this case, a method of increasing the number of pixels by interpolating pixels adjacent in a horizontal, vertical or diagonal direction in the input image IM may be used for the enlargement and a method using an average value of pixels in the horizontal or vertical directions may be used for reduction. However, the inventive concept is not restricted to these examples.

Referring to FIG. 3, the input image IM includes A pixels in the horizontal direction and B pixels in the vertical direction, where A and B are integers of at least 1. In this case, A and B refer to the horizontal length and vertical length, respectively, of the input image IM. In addition, a resolution may be expressed as the product of the horizontal length and the vertical length of an image. The first resolution of the input image IM is A×B.

FIG. 3 illustrates a case where the scaler 210 reduces the input image IM of A×B through scaling. The scaler 210 may generate the scaled input image IM_HS by performing horizontal scaling on the input image IM. The horizontal scaling may be an operation of decreasing or increasing the horizontal length of the input image IM by multiplying the horizontal length by a horizontal scale factor M, where M is a real number greater than 0. Accordingly, the scaled input image IM_HS has a horizontal length of A×M and a vertical length of B.

The scaler 210 may perform vertical scaling on the scaled input image IM_HS or a vertical scaling medium image IM_VSM, thereby generating the output image OM. The vertical scaling may be an operation of decreasing or increasing the vertical length of the scaled input image IM_HS by multiplying the vertical length of the scaled input image IM_HS by a vertical scale factor N, where N is a real number greater than 0. Accordingly, the output image OM has a horizontal length of A×M and a vertical length of B×N.

In this case, it is assumed that the horizontal scaling and the vertical scaling are performed using an average value. For instance, when the vertical scale factor is 1/4 in a first method, the scaler 210 performs horizontal scaling on a first line of the input image IM to generate the scaled input image IM_HS for the first line, performs horizontal scaling on a second line of the input image IM to generate the scaled input image IM_HS for the second line, reads the scaled input image IM_HS for the first line from the memory 230 or 240, and adds the scaled input image IM_HS for the second line and the scaled input image IM_HS for the first line, which has been read from the memory 230 or 240, to generate the vertical scaling medium image IM_VSM. After generating the vertical scaling medium image IM_VSM by performing the same operation on the third and fourth lines of the input image IM, the scaler 210 may perform the remaining operation (e.g., multiplication of the vertical scale factor in case of a method using an average value) of the vertical scaling on the vertical scaling medium image IM_VSM, thereby generating and outputting the output image OM for the first through fourth lines.

When the vertical scale factor is 1/4 in a second method, the scaler 210 performs horizontal scaling on a first line of the input image IM to generate the scaled input image IM_HS for the first line and performs horizontal scaling on a second line of the input image IM to generate the scaled input image IM_HS for the second line. Thereafter, instead of reading the scaled input image IM_HS for the first line from the memory 230 or 240 and generating the vertical scaling medium image IM_VSM as in the first method, the scaler 210 sequentially generates and stores the scaled input image IM_HS for the first through fourth lines in the memory 230 or 240 and then reads and performs vertical scaling on the scaled input image IM_HS for the first through fourth lines at a time, thereby generating and outputting the output image OM for the first through fourth lines.

The first and second scaling methods have been described as examples of a method of performing vertical scaling in the scaler 210, but the present disclosure is not limited to these methods. The scaler 210 may perform the horizontal scaling and the vertical scaling in parallel to increase processing speed and performance. Although the scaler 210 performs the vertical scaling on the scaled input image IM_HS which is the result of the horizontal scaling in the embodiments of the present disclosure illustrated in FIGS. 2 and 3, the present disclosure is not limited to the these embodiments. The scaler 210 may perform the horizontal scaling on the result of the vertical scaling in another embodiment of the present disclosure.

The selection circuit 220 may selectively transmit the scaled input image IM_HS or the vertical scaling medium image IM_VSM to the low latency memory 230 or the high density memory 240 in response to a memory selection signal MS. When the memory selection signal MS is at a low level, the selection circuit 220 may transmit the scaled input image IM_HS or the vertical scaling medium image IM_VSM to the low latency memory 230. When the memory selection signal MS is at a high level, the selection circuit 220 may transmit the scaled input image IM_HS or the vertical scaling medium image IM_VSM to the high density memory 240. The selection circuit 220 may be implemented as a demultiplexer.

The low latency memory 230 may receive and store the scaled input image IM_HS or the vertical scaling medium image IM_VSM and may transmit it to the scaler 210 according to the control of the scaler 210. The low latency memory 230 may have nearly no latency in data read and write operations. In this case, it is assumed that the low latency memory 230 has no latency. The low latency memory 230 may have a larger area than the high density memory 240. The low latency memory 230 may be implemented using at least one flip-flop.

The high density memory 240 may receive and store the scaled input image IM_HS or the vertical scaling medium image IM_VSM and may transmit it to the scaler 210 according to the control of the scaler 210. The high density memory 240 may have some latency in the read and write operations as compared to the low latency memory 230. The latency of the read operation may be greater than that of the write operation. It is assumed here, for example, that the high density memory 240 has a latency of two cycles of a clock signal (CLK in FIG. 5) in the read operation and has no latency in the write operation. The clock signal CLK is a signal on which the image processor 200 operates and may be received from a signal generator internal or external to the image processor 200. A cycle corresponds to a period of the clock signal CLK.

The high density memory 240 may occupy a very small area as compared to the low latency memory 230. The high density memory 240 may be formed of SRAM or DRAM. Alternatively, the high density memory 240 may be external to the image processor 200, for example, in the RAM 130 or the memory 175 illustrated in FIG. 1.

The controller 250 may control the overall operation of the image processor 200. The controller 250 may control the scaling operation of the scaler 210 according to scaling information SF about a horizontal scale factor and a vertical scale factor. The scaling information SF may be generated by the CPU 110.

The controller 250 may receive image information IF including information about the horizontal length of the input image IM and may generate the memory selection signal MS based on the image information IF. Alternatively, the controller 250 may temporarily store the image information IF and transmit it to the scaler 210, so that the scaler 210 internally generates the memory selection signal MS based on the image information IF.

The controller 250 may include a control register 255 which may store the scaling information SF, the image information IF, and a specification of the internal components of the image processor 200. The specification may include information about a number of pixels on which the scaler 210 is able to perform horizontal or vertical scaling per cycle of the clock signal CLK and information about read latency of the high density memory 240. The read latency is a delay time of the high density memory 240 in a read operation. As described above, the read latency is assumed to be two cycles of the clock signal CLK. It is assumed here, for example, that the number of pixels on which the scaler 210 is able to perform horizontal or vertical scaling per cycle of the clock signal CLK is 1, but the present disclosure is not limited to this embodiment of the present disclosure.

The controller 250 may generate the memory selection signal MS based on the horizontal length of the input image IM, the number of pixels processed per cycle of the clock signal CLK, and the read latency of the high density memory 240. In detail, the controller 250 may determine the level of the memory selection signal MS according to a result of comparing a horizontal processing cycle obtained by dividing the horizontal length of the input image IM by the number of pixels processed per cycle of the clock signal CLK with the read latency of the high density memory 240. The horizontal processing cycle may be the number of cycles of the clock signal CLK required to process a single line of the input image IM.

When the horizontal processing cycle is greater than the read latency of the high density memory 240, the controller 250 may generate the memory selection signal MS at the high level to control the selection circuit 220 to transmit the scaled input image IM_HS or the vertical scaling medium image IM_VSM to the high density memory 240. When the horizontal processing cycle is less than or equal to the read latency of the high density memory 240, the controller 250 may generate the memory selection signal MS at the low level to control the selection circuit 220 to transmit the scaled input image IM_HS or the vertical scaling medium image IM_VSM to the low latency memory 230. The controller 250 determines the level of the memory selection signal MS as described above in order to perform scaling on the input image IM without any idle cycles between lines of the input image IM. The detailed description below will be presented with reference to FIGS. 4 through 6.

Figure 4:
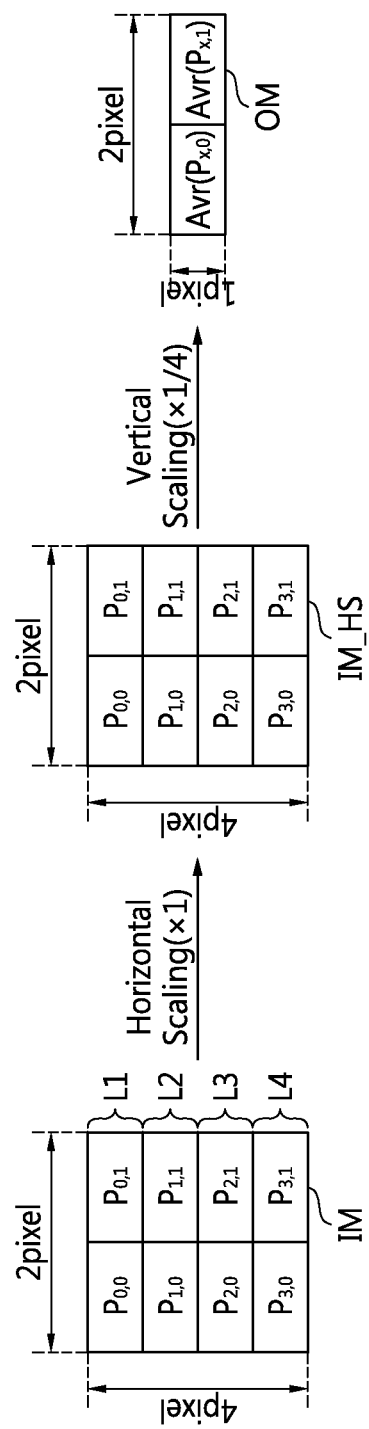
FIG. 4 is a diagram of a scaling operation illustrated in FIG. 3 according to an embodiment of the present disclosure.

FIG. 4 is a diagram of a scaling operation illustrated in FIG. 3 according to an embodiment of the present disclosure.

Figure 5:
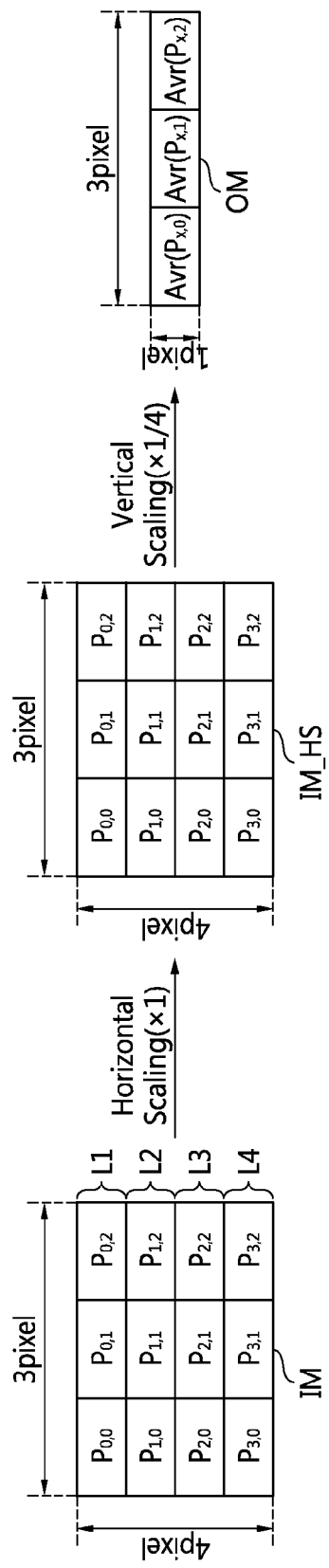
FIG. 5 is a diagram of a scaling operation illustrated in FIG. 3 according to an embodiment of the present disclosure.

FIG. 5 is a diagram of a scaling operation illustrated in FIG. 3 according to an embodiment of the present disclosure.

Referring to FIGS. 1 through 4, FIG. 4 illustrates a scaling operation when A is 2, B is 4, M is 1, and N is 1/4. In other words, the input image IM includes two pixels in the horizontal direction and four pixels in the vertical direction and thus has a resolution of 2×4. The input image IM is horizontally scaled using a horizontal scale factor of 1 into the scaled input image IM_HS having a resolution of 2×4. The scaled input image IM_HS is vertically scaled using a vertical scale factor of 1/4 into the output image OM having a resolution of 2×1.

The input image IM includes first through fourth lines L1 through L4 and each line includes two pixels, for example, the first line L1 includes pixels $P_{0,0}$ and $P_{0,1}$. Here, $P_{a,b}$ denotes a pixel value of a pixel located at the intersection between an a-th row and a b-th column, where "a" and "b" are integers of at least 1. Since the scaler 210 reduces the input image IM using an average value in an embodiment of the present disclosure, the pixels of the output image OM respectively correspond to an average value $Avr(P_{x,0})$ of $P_{0,0}$, $P_{1,0}$, $P_{2,0}$, and $P_{3,0}$ and an average value $Avr(P_{x,1})$ of $P_{0,1}$, $P_{1,1}$, $P_{2,1}$, and $P_{3,1}$.

FIG. 5 shows the scaling operation when A is 3, B is 4, M is 1, and N is 1/4. In other words, the input image IM includes three pixels in the horizontal direction, unlike the input image IM illustrated in FIG. 4, and four pixels in the vertical direction and thus has a resolution of 3×4. The input image IM is horizontally scaled using a horizontal scale factor of 1 into the scaled input image IM_HS having a resolution of 3×4. The scaled input image IM_HS is vertically scaled using a vertical scale factor of 1/4 into the output image OM having a resolution of 3×1.

The input image IM includes first through fourth lines L1 through L4 and each line includes three pixels, for example, the first line L1 includes pixels $P_{0,0}$, $P_{0,1}$, and $P_{0,2}$. Since the scaler 210 reduces the input image IM using an average value in an embodiment of the present disclosure, the pixels of the output image OM respectively correspond to the average value $Avr(P_{x,0})$ of $P_{0,0}$, $P_{1,0}$, $P_{2,0}$, and $P_{3,0}$, the average value $Avr(P_{x,1})$ of $P_{0,1}$, $P_{1,1}$, $P_{2,1}$, and $P_{3,1}$, and an average value $Avr(P_{x,2})$ of $P_{0,2}$, $P_{1,2}$, $P_{2,2}$, and $P_{3,2}$.

Figure 6:
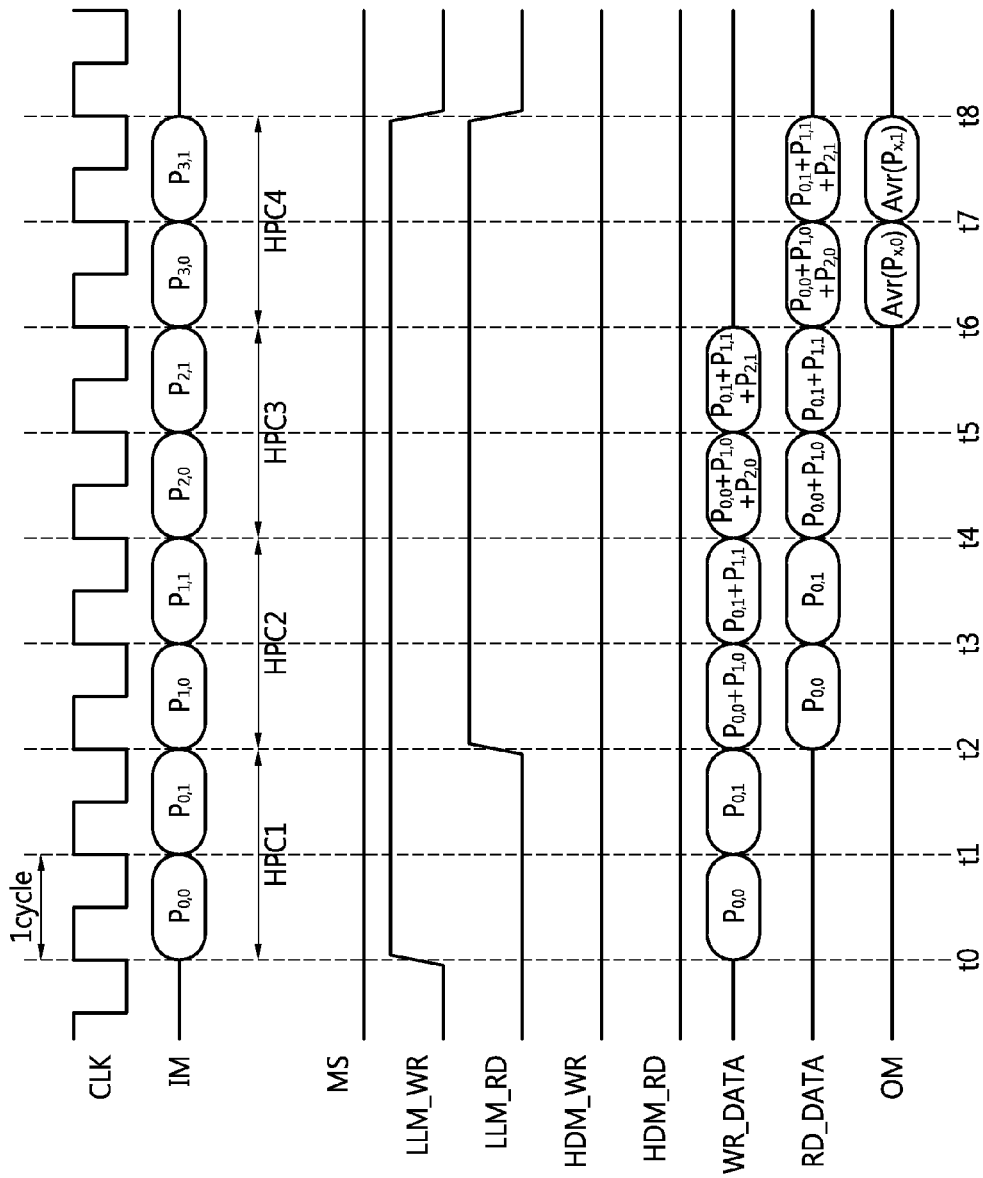
FIG. 6 is a timing chart illustrating an operation of the image processor when a memory selection signal illustrated in FIG. 2 is at a low level according to an embodiment of the present disclosure.

FIG. 6 is a timing chart illustrating an operation of the image processor 200 when the memory selection signal MS illustrated in FIG. 2 is at the low level according to an embodiment of the present disclosure.

Figure 7:
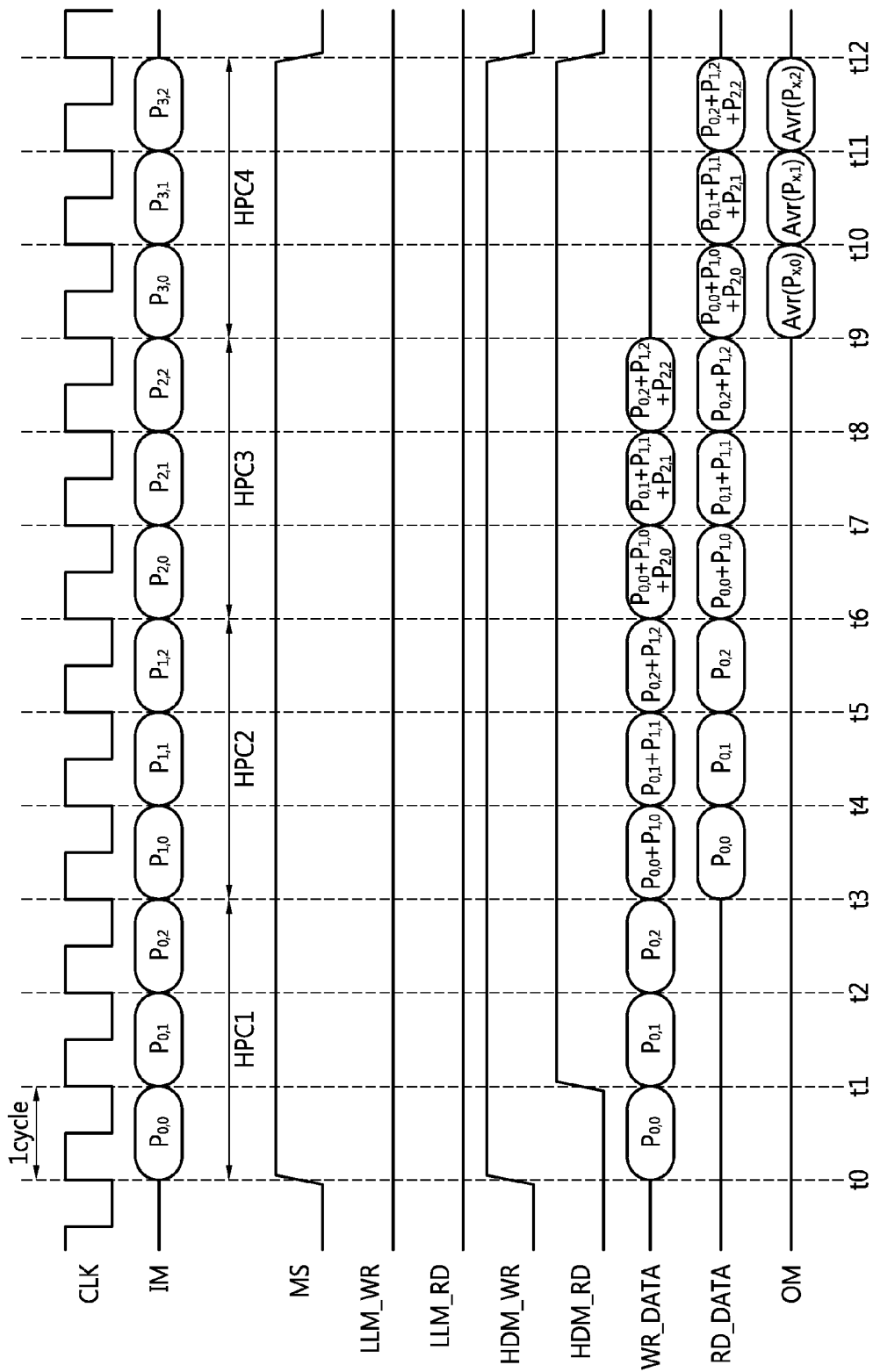
FIG. 7 is a timing chart illustrating an operation of the image processor when a memory selection signal illustrated in FIG. 2 is at a high level according to an embodiment of the present disclosure.

FIG. 7 is a timing chart illustrating an operation of the image processor 200 when the memory selection signal MS illustrated in FIG. 2 is at the high level according to an embodiment of the present disclosure.

Referring to FIGS. 1 through 7, FIG. 6 shows the timing of signals when the scaled input image IM_HS is stored in the low latency memory 230 according to the memory selection signal MS being at the low level. In other words, FIG. 6 is a timing chart for an operation of the image processor 200 when the horizontal processing cycle (e.g. two cycles in FIG. 4), which is a result of dividing the horizontal length (e.g. 2 in FIG. 4) of the input image IM by the number of pixels (assumed to be 1 in an embodiment of the present disclosure) processed per cycle of the clock signal CLK, is less than or equal the read latency (e.g. two cycles) of the high density memory 240, as shown in FIG. 4. It is also assumed that the scaler 210 operates according to the first method described above with reference to FIG. 2.

The memory selection signal MS is maintained at the low level while scaling is performed on the input image IM in a period between a time point t0 and a time point t8. Accordingly, a high density memory write enable signal HDM_WR and a high density memory read enable signal HDM_RD are maintained at a low level during the scaling of the input image IM from time point t0 to the time point t8.

A memory control signal HDM_WR, HDM_RD, low latency memory write LLM_WR, or low latency memory read LLM_RD is a signal for enabling the read or write operation of the high density memory 240 or the low latency memory 230. Each of the memory control signal HDM_WR, HDM_RD, LLM_WR, and LLM_RD may be generated by the scaler 210 or the controller 250 and provided for the memory 230 or 240. Although each of the memory control signal HDM_WR, HDM_RD, LLM_WR, and LLM_RD is maintained at a high level in a certain period (e.g., between time points t2 and t8 for the signal LLM_RD in FIG. 6) in the embodiment of the present disclosure illustrated in FIG. 6 or 7, memory addresses enabled in different periods (e.g., a memory address of the pixel value $P_{0,0}$ in a period between time points t2 and t3 and a memory address of the pixel value $P_{0,1}$ in a period between time points t3 and t4) may be different from each other.

In a period from the time point t0 to a time point t1, the scaler 210 receives the pixel value $P_{0,0}$ of the first line L1 and performs horizontal scaling (but practically does not perform the scaling operation since the horizontal scale factor is 1, which results in not change in scale) on the pixel value $P_{0,0}$ and the scaled input image IM_HS is written to the low latency memory 230 (WR_DATA). For this operation, the low latency memory write enable signal LLM_WR transitions from the low level to the high level. In this case, the pixel value $P_{0,0}$ of the first line L1 is a first pixel value, and therefore, the scaled input image IM_HS is the same as the pixel value $P_{0,0}$ of the first line L1.

In a period from the time point t1 to the time point t2, the scaler 210 receives the pixel value $P_{0,1}$ of the first line L1 and performs horizontal scaling on the pixel value $P_{0,1}$ and the scaled input image IM_HS for the first line L1 is written to the low latency memory 230 (WR_DATA). Since the horizontal scale factor is 1, the scaled input image IM_HS is the same as the pixel value $P_{0,1}$ of the first line L1 of the input image IM.

When there are four pixels in each line, the horizontal scale factor is 1/2, and scaling is performed using an average value in an embodiment of the present disclosure; the scaled input image IM_HS corresponding to an average of two pixels is output from the scaler 210 for every two pixels. However, it is assumed that the horizontal scale factor is 1 in the present example. When the horizontal scaling on pixels in the first line L1 is completed, a horizontal processing cycle HPC1 for the first line L1 is also completed.

In a period from the time point t2 to the time point t3, the scaler 210 receives the pixel value $P_{1,0}$ of the second line L2 and performs horizontal scaling on the pixel value $P_{1,0}$. In this case, the low latency memory read enable signal LLM_RD transitions from the low level to the high level and the pixel value $P_{0,0}$ of the first line L1 is read from the low latency memory 230 and is transmitted to the scaler 210 without any latency (RD_DATA).

The scaler 210 may perform an operation on the pixel value $P_{1,0}$ of the second line L2 that has just been subjected to the horizontal scaling and the pixel value $P_{0,0}$ of the first line L1 received from the low latency memory 230 and thus output the operation result as the vertical scaling medium image IM_VSM. Since the scaler 210 uses an average value in the present example, the vertical scaling medium image IM_VSM corresponds to the sum of the pixel value $P_{0,0}$ of the first line L1 and the pixel value $P_{1,0}$ of the second line L2. In other words, the sum of the pixel value $P_{0,0}$ of the first line L1 and the pixel value $P_{1,0}$ of the second line L2 is a medium result obtained in the course of vertical scaling on the first and second lines L1 and L2.

Thereafter, when the vertical scaling on the first through fourth lines L1 through L4 is completed in a period from a time point t6 to a time point t7, the average value $Avr(P_{x,0})$ of corresponding pixels in the first through fourth lines L1 through L4 is a final value of the vertical scaling on the pixels.

The vertical scaling medium image IM_VSM is written to the low latency memory 230 (WR_DATA).

In a period from the time point t3 to the time point t4, the scaler 210 receives the pixel value $P_{1,1}$ of the second line L2 and performs horizontal scaling on the pixel value $P_{1,1}$. In this case, the pixel value $P_{0,1}$ of the first line L1 is read from the low latency memory 230 and transmitted to the scaler 210 without latency (RD_DATA).

The scaler 210 may perform an operation on the pixel value $P_{1,1}$ of the second line L2 that has just been subjected to the horizontal scaling and the pixel value $P_{0,1}$ of the first line L1 received from the low latency memory 230 and thus output the operation result as the vertical scaling medium image IM_VSM. Since the scaler 210 uses an average value in the current embodiments, the vertical scaling medium image IM_VSM corresponds to the sum of the pixel value $P_{0,1}$ of the first line L1 and the pixel value $P_{1,1}$ of the second line L2. In other words, the sum of the pixel value $P_{0,1}$ of the first line L1 and the pixel value $P_{1,1}$ of the second line L2 is a medium result obtained in the course of vertical scaling on the first and second lines L1 and L2.

Thereafter, when the vertical scaling on the first through fourth lines L1 through L4 is completed in a period from the time point t7 to the time point t8, the average value Avr($P_{x,1}$) of corresponding pixels in the first through fourth lines L1 through L4 is a final value of the vertical scaling on the pixels.

The vertical scaling medium image IM_VSM is written to the low latency memory 230 (WR_DATA).

When the horizontal scaling on pixels in the second line L2 is completed, a horizontal processing cycle HPC2 for the second line L2 is also completed.

In a period from the time point t4 to a time point t5, the scaler 210 receives the pixel value $P_{2,0}$ of the third line L3 and performs horizontal scaling on the pixel value $P_{2,0}$. In this case, the vertical scaling medium image IM_VSM corresponding to the sum of the pixel value $P_{0,0}$ of the first line L1 and the pixel value $P_{1,0}$ of the second line L2 is read from the low latency memory 230 and transmitted to the scaler 210 without latency (RD_DATA).

The scaler 210 may perform an operation on the pixel value $P_{2,0}$ of the third line L3 that has just been subjected to the horizontal scaling and the sum of the pixel value $P_{0,0}$ of the first line L1 and the pixel value $P_{1,0}$ of the second line L2 received from the low latency memory 230 and thus output the operation result as the vertical scaling medium image IM_VSM. Since the scaler 210 uses an average value in the current embodiments, the vertical scaling medium image IM_VSM corresponds to the sum of the pixel value $P_{0,0}$ of the first line L1, the pixel value $P_{1,0}$ of the second line L2, and the pixel value $P_{2,0}$ of the third line L3. The vertical scaling medium image IM_VSM is written to the low latency memory 230 (WR_DATA).

In a period from the time point t5 to the time point t6, the scaler 210 receives the pixel value $P_{2,1}$ of the third line L3 and performs horizontal scaling on the pixel value $P_{2,1}$. In this case, the vertical scaling medium image IM_VSM corresponding to the sum of the pixel value $P_{0,1}$ of the first line L1 and the pixel value $P_{1,1}$ of the second line L2 is read from the low latency memory 230 and transmitted to the scaler 210 without latency (RD_DATA).

The scaler 210 may perform an operation on the pixel value $P_{2,1}$ of the third line L3 that has just been subjected to the horizontal scaling and the sum of the pixel value $P_{0,1}$ of the first line L1 and the pixel value $P_{1,1}$ of the second line L2 received from the low latency memory 230 and thus output the operation result as the vertical scaling medium image IM_VSM. Since the scaler 210 uses an average value in the present example, the vertical scaling medium image IM_VSM corresponds to the sum of the pixel value $P_{0,1}$ of the first line L1, the pixel value $P_{1,1}$ of the second line L2, and the pixel value $P_{2,1}$ of the third line L3. The vertical scaling medium image IM_VSM is written to the low latency memory 230 (WR_DATA).

When the horizontal scaling on pixels in the third line L3 is completed, a horizontal processing cycle HPC3 for the third line L3 is also completed.

In a period from the time point t6 to a time point t7, the scaler 210 receives the pixel value $P_{3,0}$ of the fourth line L4 and performs horizontal scaling on the pixel value $P_{3,0}$. In this case, the vertical scaling medium image IM_VSM corresponding to the sum of the pixel value $P_{0,0}$ of the first line L1, the pixel value $P_{1,0}$ of the second line L2, and the pixel value $P_{2,0}$ of the third line L3 is read from the low latency memory 230 and transmitted to the scaler 210 without latency (RD_DATA).

The scaler 210 may perform an operation on the pixel value $P_{3,0}$ of the fourth line L4 that has just been subjected to the horizontal scaling and the sum of the pixel value $P_{0,0}$ of the first line L1, the pixel value $P_{1,0}$ of the second line L2, and the pixel value $P_{2,0}$ of the third line L3 received from the low latency memory 230 and thus output the operation result as the output image OM. Since the scaler 210 uses an average value in the current embodiments, the output image OM corresponds to the average value Avr($P_{x,0}$) obtained by dividing the sum of the pixel value $P_{0,0}$ of the first line L1, the pixel value $P_{1,0}$ of the second line L2, the pixel value $P_{2,0}$ of the third line L3, and the pixel value $P_{3,0}$ of the fourth line L4 by a total line number of 4.

In a period from the time point t7 to a time point t8, the scaler 210 receives the pixel value $P_{3,1}$ of the fourth line L4 and performs horizontal scaling on the pixel value $P_{3,1}$. In this case, the vertical scaling medium image IM_VSM corresponding to the sum of the pixel value $P_{0,1}$ of the first line L1, the pixel value $P_{1,1}$ of the second line L2, and the pixel value $P_{2,1}$ of the third line L3 is read from the low latency memory 230 and transmitted to the scaler 210 without latency (RD_DATA).

The scaler 210 may perform an operation on the pixel value $P_{3,1}$ of the fourth line L4 that has just been subjected to the horizontal scaling and the sum of the pixel value $P_{0,1}$ of the first line L1, the pixel value $P_{1,1}$ of the second line L2, and the pixel value $P_{2,1}$ of the third line L3 received from the low latency memory 230 and thus output the operation result as the output image OM. Since the scaler 210 uses an average value in the present example, the output image OM corresponds to the average value Avr($P_{x,1}$) obtained by dividing the sum of the pixel value $P_{0,1}$ of the first line L1, the pixel value $P_{1,1}$ of the second line L2, the pixel value $P_{2,1}$ of the third line L3, and the pixel value $P_{3,1}$ of the fourth line L4 by a total line number of 4. When the horizontal scaling on pixels in the fourth line L4 is completed, a horizontal processing cycle HPC4 for the fourth line L4 is also completed.

Consequently, in a period from the time point t6 to the time point t8, horizontal scaling and vertical scaling are performed on the input image IM having a resolution of 2×4 with a horizontal scale factor of 1 and a vertical scale factor of 1/4, so that the output image OM having a resolution of 2×1 is output.

FIG. 7 illustrates the timing of signals when the scaled input image IM_HS or the vertical scaling medium image IM_VSM is stored in the high density memory 240 according to the memory selection signal MS at the high level. In other words, FIG. 7 is a timing chart for an operation of the image processor 200 when the horizontal processing cycle (e.g. three cycles in FIG. 5), which is a result of dividing the horizontal length (e.g. 3 in FIG. 5) of the input image IM by the number of pixels (assumed to be 1 in an embodiment of the present disclosure) processed per cycle of the clock signal CLK, is greater than the read latency (e.g. two cycles) of the high density memory 240, as shown in FIG. 5.

The memory selection signal MS is maintained at the high level while scaling is performed on the input image IM in a period between the time point t0 and a time point t12. Accordingly, the low latency memory write enable signal LLM_WR and the low latency memory read enable signal LLM_RD are maintained at a low level during the scaling of the input image IM from time point t0 to the time point t12.

The operation illustrated in FIG. 7 is substantially the same as that illustrated in FIG. 6, with the exception that the memory selection signal MS is at the high level since the horizontal length of the input image IM is 3. Since the horizontal length of the input image IM is 3 in the embodiment of the present disclosure illustrated in FIG. 7, the horizontal processing cycles HPC1 through HPC4 for the respective lines L1 through L4 of the input image IM are one-cycle greater than those in the embodiment of the present disclosure illustrated in FIG. 6. Accordingly, unlike the embodiment of the present disclosure illustrated in FIG. 6, the embodiment of the present disclosure illustrated in FIG. 7 requires a total of 12 cycles to generate the output image OM.

Horizontal scaling, read and write operations of the high density memory 240 and vertical scaling on each of the lines L1 through L4 of the input image IM in the embodiment of the present disclosure illustrated in FIG. 7 are substantially the same as the horizontal scaling, the read and write operations of the low latency memory 230 and the vertical scaling on each of the lines L1 through L4 of the input image IM in the embodiment of the present disclosure illustrated in FIG. 6. Therefore, a description of the operations at each of the time points t0 through t12 is omitted below.

However, since the high density memory 240 has a read latency of two cycles, the high density memory read enable signal HDM_RD for reading the pixel value $P_{0,0}$ of the first line L1 transitions from the low level to the high level at the time point t1, two cycles before the time point t3 so that the pixel value $P_{0,0}$ of the first line L1 is provided for the scaler 210 at the time point t3. In other words, only when the writing of the pixel value $P_{0,0}$ to the high density memory 240 is completed and the high density memory read enable signal HDM_RD transitions from the low level to the high level to start reading pixel value $P_{0,0}$ from the high density memory 240 at the time point t1, the pixel value $P_{0,0}$ can be provided for the scaler 210 at the time point t3 at which the horizontal processing cycle HPC2 for the second line L2 starts.

When the pixel value $P_{0,0}$ is provided for the scaler 210 at the time point t3 even in a case where the horizontal length of the input image IM is 2, vertical scaling using the pixel value $P_{0,0}$ cannot be performed during one cycle from the time point t2 to the time point t3, and therefore, a cycle in which scaling is not performed is needed. In other words, a cycle without scaling is required for each line of the input image IM, which leads to the deterioration of performance of the image processor 200.

However, in the image processor 200 according to an embodiment of the present disclosure, the controller 250 controls the selection circuit 220 to transmit the scaled input image IM_HS to the high density memory 240 when a horizontal processing cycle is greater than the read latency of the high density memory 240, i.e. when a cycle without scaling does not occur if the high density memory 240 is used (in the case illustrated in FIG. 7). In addition, the controller 250 controls the selection circuit 220 to transmit the scaled input image IM_HS to the low latency memory 230 when a horizontal processing cycle is less than or equal to the read latency of the high density memory 240, i.e. when a cycle without scaling occurs if the high density memory 240 is used (in the case illustrated in FIG. 6). Consequently, a cycle without scaling is eliminated regardless of the horizontal length of the input image IM in the image processor 200 according to an embodiment of the present disclosure, thereby maximizing scaling performance.

Since the high density memory 240 must store the values of the pixels in the horizontal length of the scaled input image IM_HS, the minimum capacity of the high density memory 240 may be determined depending on the maximum horizontal length of the scaled input image IM_HS or the output image OM or a vertical scaling method (for example, the high density memory 240 should be able to store three lines in the second method illustrated in FIG. 2). For example, when a single memory cell can store a single pixel value, vertical scaling is performed using an average value, and the maximum horizontal length is 2160, the minimum capacity of the high density memory 240 is 2160 memory cells.

When the horizontal processing cycle is less than or equal to the read latency of the high density memory 240, that is, when the horizontal length of the input image IM is less than or equal to the number of pixels (e.g. two pixels in FIG. 7) processed during the read latency of the high density memory 240, the low latency memory 230 is selected, and therefore, the capacity of the low latency memory 230 may be determined depending on the number of pixels processed during the read latency of the high density memory 240. The vertical scaling method may also be a factor that determines the capacity of the low latency memory 230. In other words, the low latency memory 230 needs a capacity corresponding to the number of pixels processed during the read latency of the high density memory 240, so that the area of the low latency memory 230 can be minimized.

Consequently, the image processor 200 according to some embodiments of the inventive concept increases the degree of integration by minimizing the low latency memory 230, which usually occupies a large area, without performance deterioration. Although cases where the input image IM is enlarged using horizontal scaling or vertical scaling have not been described, the image processor 200 may operate in the same manner as described above in these cases.

Figure 8:
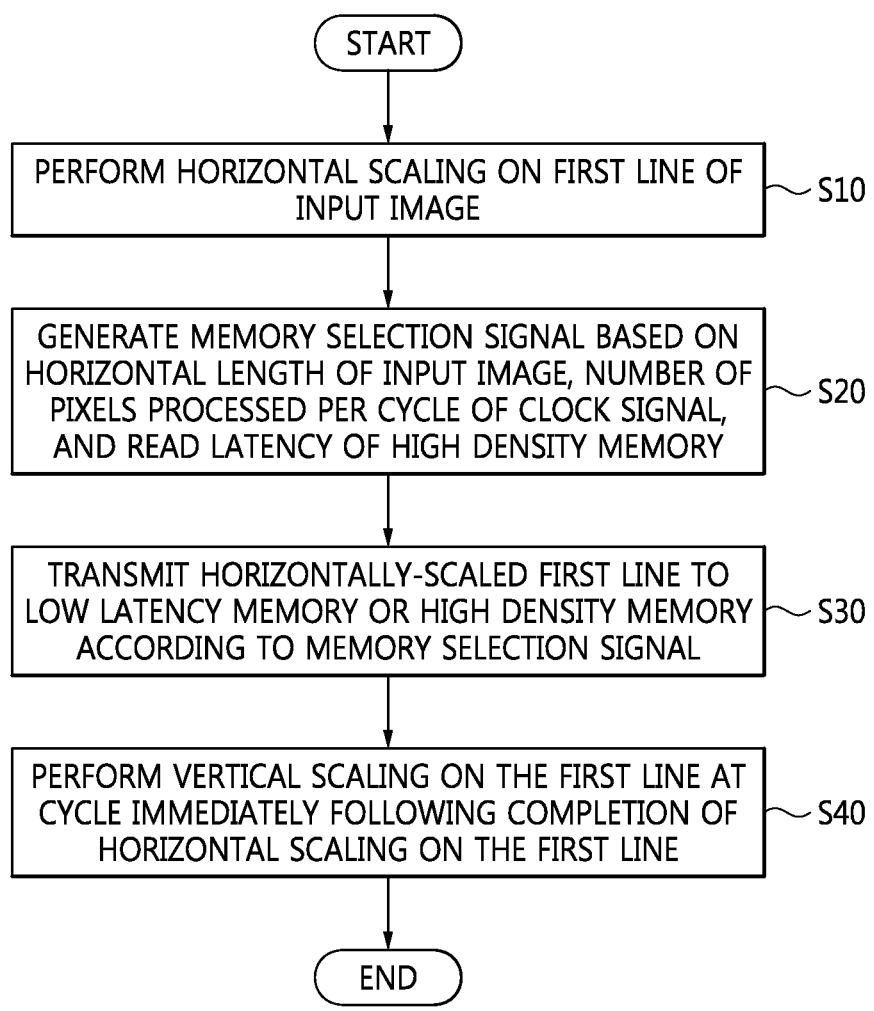
FIG. 8 is a flowchart of a method of operating the image processor illustrated in FIG. 1 according to an embodiment of the present disclosure.

FIG. 8 is a flowchart of a method of operating the image processor 200 illustrated in FIG. 1 according to an embodiment of the present disclosure.

Referring to FIGS. 1 through 8, the scaler 210 may perform horizontal scaling on the first line L1 of the input image IM to generate the scaled input image IM_HS in step S10.

The controller 250 may generate the memory selection signal MS based on the horizontal length of the input image IM, the number of pixels processed per cycle of the clock signal CLK, and the read latency of the high density memory 240 in step S20. The selection circuit 220 may transmit the scaled input image IM_HS, i.e., the first line L1 that has been horizontally scaled, to the low latency memory 230 or the high density memory 240 according to the memory selection signal MS in step S30. The scaler 210 may perform vertical scaling on the first line L1 at a cycle (e.g. between the time points t2 and t3 in FIG. 6 or t3 and t4 in FIG. 7) immediately following the completion of the horizontal scaling on the first line L1 in step S40.

Figure 9:
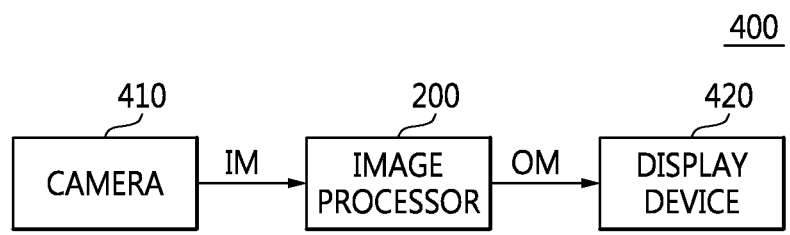
FIG. 9 is a block diagram of an image processing system including the image processor illustrated in FIG. 2 according to an embodiment of the present disclosure.

FIG. 9 is a block diagram of an image processing system 400 including the image processor 200 illustrated in FIG. 2 according to an embodiment of the present disclosure.

Referring to FIGS. 1, 2, and 9, the image processing system 400 may include a camera 410, the image processor 200, and a display device 420.

The camera 410 may generate the input image IM, i.e., image data corresponding to a captured image. The camera 410 may be the camera 155 illustrated in FIG. 1. The image processor 200 may perform scaling on the input image IM to output the output image OM having a predetermined resolution, as shown in FIG. 2. The display device 420 may display the output data on a screen based on the output data OM. The display device 420 may be the display device 165 illustrated in FIG. 1.

Figure 10:
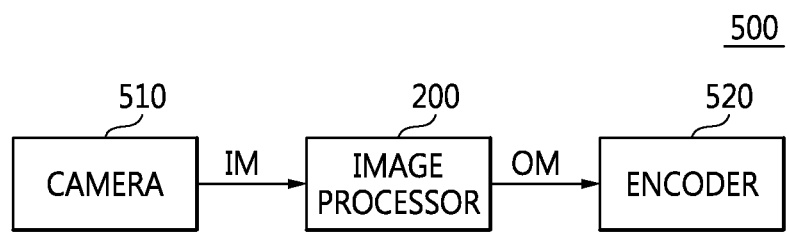
FIG. 10 is a block diagram of an image processing system including the image processor illustrated in FIG. 2 according to an embodiment of the present disclosure.

FIG. 10 is a block diagram of an image processing system 500 including the image processor 200 illustrated in FIG. 2 according to an embodiment of the present disclosure.

Referring to FIGS. 1, 2, and 10, the image processing system 500 may include a camera 510, the image processor 200, and an encoder 520.

The camera 510 may generate the input image IM, i.e. image data corresponding to a captured image. The camera 510 may be the camera 155 illustrated in FIG. 1. The image processor 200 may perform scaling on the input image IM to output the output image OM having a predetermined resolution, as shown in FIG. 2. The encoder 520 may perform encoding based on the output image OM according to a format selected by a user. The encoder 520 may be the encoder 142 illustrated in FIG. 1.

Figure 11:
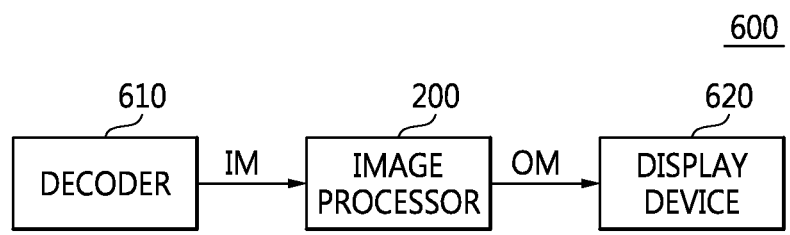
FIG. 11 is a block diagram of an image processing system including the image processor illustrated in FIG. 2 according to an embodiment of the present disclosure.

FIG. 11 is a block diagram of an image processing system 600 including the image processor 200 illustrated in FIG. 2 according to an embodiment of the present disclosure.

Referring to FIGS. 1, 2, and 11, the image processing system 600 may include a decoder 610, the image processor 200, and a display device 620.

The decoder 610 may decode image data that has been encoded in a predetermined format to generate the input image IM. The decoder 610 may be the decoder 144 illustrated in FIG. 1. The image processor 200 may perform scaling on the input image IM to output the output image OM having a predetermined resolution, as shown in FIG. 2. The display device 620 may display the output data on a screen based on the output data OM. The display device 620 may be the display device 165 illustrated in FIG. 1.

The present disclosure provides a chipset of an image processor. The chipset is configured to perform horizontal scaling on a first line of an input image; transmit the first line that has been vertically scaled to a low latency memory or a high density memory according to a memory selection signal; and perform vertical scaling on the first line at a cycle following completion of the horizontal scaling on the first line.

As described above, according to according to an embodiment of the present disclosure, an image processor eliminates cycles in which no scaling is performed regardless of the horizontal length of an input image, thereby maximizing scaling performance. In addition, a low latency memory occupying a large area is minimized without performance deterioration, so that the degree of integration is increased.

While the present disclosure has been illustrated and described with reference to certain embodiments thereof, it will be understood by those of ordinary skill in the art that various changes in form and details may be made therein without departing from the scope and spirit of the present disclosure as defined by the appended claims and their equivalents.

The invention claimed is:

1. An image processor, comprising:
    a scaler configured to perform scaling on an input image and generate a scaled input image;
    a selection circuit configured to transmit the scaled input image to either a low latency memory or a high density memory according to a memory selection signal; and
    a controller configured to generate the memory selection signal based on a horizontal length of the input image, a number of pixels processed per cycle of a clock signal, and a read latency of the high density memory,
    wherein the memory selection signal has a level determined depending on a result of comparing a horizontal processing cycle obtained by dividing the horizontal length of the input image by the number of pixels processed per cycle of the clock signal with the read latency of the high density memory, and
    wherein the scaled input image is transmitted to the high density memory when the horizontal processing cycle is greater than the read latency of the high density memory and is transmitted to the low latency memory when the horizontal processing cycle is less than or equal to the read latency of the high density memory.

2. The image processor of claim 1, wherein the scaler performs vertical scaling on a first line of the input image at a cycle immediately following completion of horizontal scaling on the first line of the input image.

3. The image processor of claim 1, wherein a capacity of the high density memory is determined depending on a maximum horizontal length of the scaled input image or a vertical scaling method.

4. The image processor of claim 1, wherein a capacity of the low latency memory is determined depending on the number of pixels processed during read latency of the high density memory or a vertical scaling method.

5. The image processor of claim 1, wherein the low latency memory is formed using at least one flip-flop.

6. An application processor, comprising:
    a memory configured to store an input image;
    an image processor configured to scale the input image, wherein the image processor comprises a scaler configured to perform scaling on the input image and generate a scaled input image and a selection circuit configured to transmit the scaled input image to either a low latency memory or a high density memory according to a memory selection signal; and
    a controller configured to generate the memory selection signal based on a horizontal length of the input image, a number of pixels processed per cycle of a clock signal, and a read latency of the high density memory,
    wherein the memory selection signal has a level determined depending on a result of comparing a horizontal processing cycle obtained by dividing the horizontal length of the input image by the number of pixels processed per cycle of the clock signal with the read latency of the high density memory, and
    wherein the scaled input image is transmitted to the high density memory when the horizontal processing cycle is greater than the read latency of the high density memory and is transmitted to the low latency memory when the horizontal processing cycle is less than or equal to the read latency of the high density memory.

7. The application processor of claim 6, wherein the scaler is further configured to perform vertical scaling on a first line of the input image at a cycle immediately following completion of horizontal scaling on the first line of the input image.

8. The application processor of claim 6, wherein a capacity of the high density memory is determined depending on a maximum horizontal length of the scaled input image or a vertical scaling method.

9. A chipset of an image processor, the chipset configured to:
    perform horizontal scaling on a first line of an input image;
    transmit the first line that has been vertically scaled to a low latency memory or a high density memory according to a memory selection signal;
    perform vertical scaling on the first line at a cycle following completion of the horizontal scaling on the first line; and
    generate the memory selection signal based on a horizontal length of the input image, a number of pixels processed per cycle of a clock signal, and a read latency of the high density memory, wherein the memory selection signal has a level determined depending on a result of comparing a horizontal processing cycle obtained by dividing the horizontal length of the input image by the number of pixels processed per cycle of the clock signal with the read latency of the high density memory, and wherein a scaled input image is transmitted to the high density memory when the horizontal processing cycle is greater than the read latency of the high density memory and is transmitted to the low latency memory when the horizontal processing cycle is less than or equal to the read latency of the high density memory.

10. The chipset of an image processor of claim 9, wherein a capacity of the high density memory is determined depending on a maximum horizontal length of the scaled input image or a vertical scaling method.

11. The chipset of an image processor of claim 9, wherein a capacity of the low latency memory is determined depending on the number of pixels processed during read latency of the high density memory or a vertical scaling method.

* * * * *